Feb. 13, 1968 R. H. PFLEGER 3,368,229
ADJUSTABLE MECHANICAL DOCKBOARD WITH IMPROVED SAFETY LEGS
Filed Jan. 13, 1966 4 Sheets-Sheet 1

Inventor
Robert H. Pfleger
By [signature]
Attorney

Inventor
Robert H. Pfleger

Inventor
Robert H. Pfleger
By [signature]
Attorney

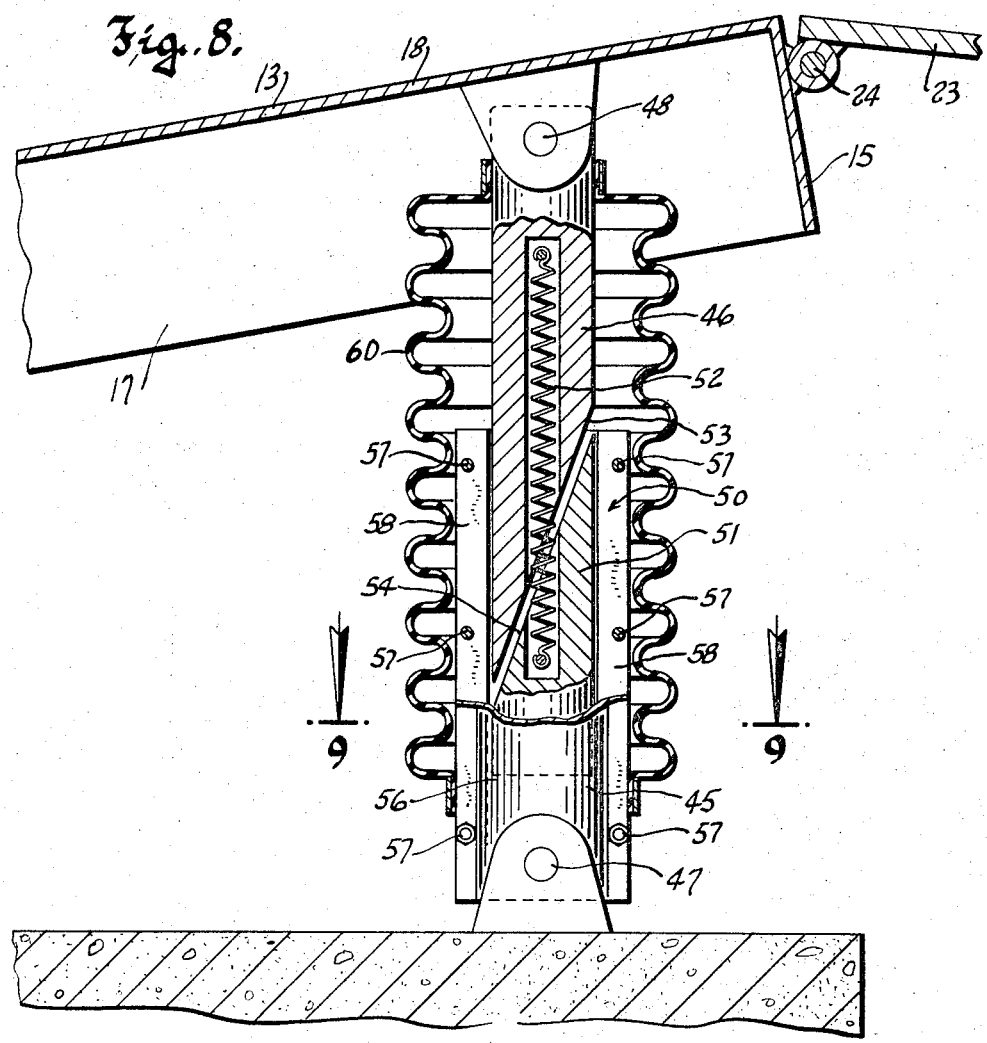
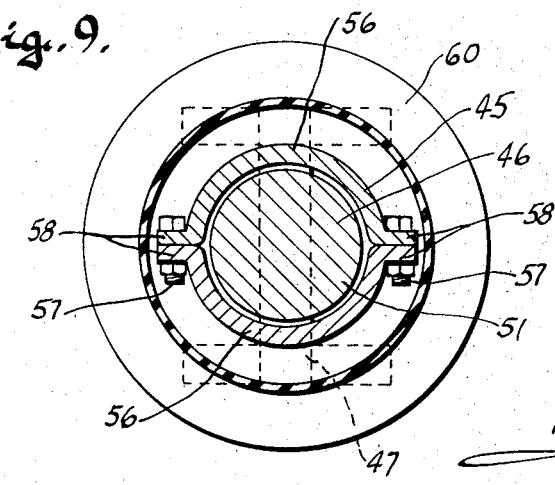

United States Patent Office 3,368,229
Patented Feb. 13, 1968

3,368,229
ADJUSTABLE MECHANICAL DOCKBOARD
WITH IMPROVED SAFETY LEGS
Robert H. Pfleger, Milwaukee, Wis., assignor to Kelley
Company, Inc., Milwaukee, Wis., a corporation of
Wisconsin
Filed Jan. 13, 1966, Ser. No. 520,518
9 Claims. (Cl. 14—71)

ABSTRACT OF THE DISCLOSURE

A ramp having its rear edge hinged to a loading dock has a hinged extension lip at its front end to project beyond the front of the dock when the lip is its raised position, and rest upon the bed of a carrier in position in front of the dock. The ramp rises and falls with changes in height of the carrier bed. Legs hinged to the underside of the ramp support the ramp against descent when the extension lip is in its pendent position, but not when the lip is in its raised operative position. An upright tube supported on the dock under the ramp has a strut which moves up and down with the ramp slidable therein. The strut has downwardly facing ratchet teeth to coact with the pawl of an escapement device on the tube to support the strut against descent into the tube and thereby prevent accidental descent of the ramp. An inertia responsive control for the escapement device keeps the pawl from supportingly engaging a ratchet tooth during gradual descent of the ramp, but an initial small increment of sudden downward motion of the strut causes the pawl to supportingly engage a ratchet tooth.

---

This invention relates to adjustable dockboards like that of the Pfleger et al. Patent No. 3,137,017, issued June 16, 1964. In fact, to a large degree, the structure of the dockboard of this invention is the same as that of the Pfleger et al. patent. Thus, as in the patent, the dockboard of this invention has a ramp hingedly mounted at its rear edge for up and down movement from a horizontal cross traffic position flush with the top of the dock. The ramp is biased upwardly and a manually releasable hold-down device holds it against rising from any position to which it is lowered. The front edge of the ramp, which is adjacent to the front of the dock, has an extension lip hinged thereto to swing from a pendent position hanging down from the front edge of the ramp to an elevated position projecting forwardly beyond the front edge of the ramp. Not only does this extension lip, when elevated, bridge the gap between the ramp and the floor of a truck, trailer or other carrier in position in front of the ramp, but by resting upon the floor of the carrier it supports the ramp at its front edge.

The extension lip is automatically raised to its elevated position by suitable mechanism actuated by the upward movement of the ramp which takes place when its hold-down device is released, and after the ramp is "walked down," that is, lowered by an attendant walking out onto it, to bring the extension lip down onto the floor of the truck or trailer, the dockboard is ready for use. As the loading or unloading operation proceeds and the weight of the load borne by the springs of the truck or trailer increases or decreases, the height of its floor correspondingly changes; and to accommodate this changing floor height, the hold-down device by which the ramp is held against elevation by the upward bias thereon, is arranged to yield to the upward force imparted to the ramp by the rising truck floor. This enables the ramp to float up and down as the loading or unloading operation proceeds.

All of the foregoing was old even prior to the aforesaid Pfleger et al. patent. It was also old to provide the ramp with so-called cross traffic legs which support the ramp in a position flush with the top of the dock, and to have these cross traffic legs movable out of their operative positions to enable the ramp to be lowered to downwardly inclined below-dock-level positions when the loading or unloading of a particular truck or trailer required it. But prior to the Pfleger et al. patent, if the truck or trailer pulled away from the dock with the ramp in a below-dock-level position, the front edge of the ramp was unsupported. This presented a danger which the invention covered by the Pfleger et al. patent eliminated. By providing the cross traffic legs with spaced abutments to engage the fixed stops upon which the cross traffic legs seat to support the ramp in its cross traffic position, any externally produced descent of the ramp was limited to a small safe increment. By thus preventing a drop of the ramp to its lowest position, the patented improvement removed the danger of a truck toppling off the dock as a result of its being driven onto a ramp which appeared to be in its supported cross traffic position, but actually was slightly below that level.

The elimination of this hazzard by the invention of the Pfleger et al. patent was a significant improvement, but since the position of the cross traffic legs was controlled by the hinged extension lip and the extension lip had to be in its pendent position for the improved cross traffic legs to be effective, the patented invention left unsolved the problem of preventing a free gravitational drop of the ramp in the event the carrier pulled away and left the ramp unsupported while a fork-lift truck or other heavy load moving machine was on the ramp. In that case, everything on the ramp—including its hinged extension lip—would suddenly drop at the same gravitational rate, and the cross traffic legs, being in their inoperative positions due to the elevated condition of the extension lip, would be incapable of stopping the consequent fall of the ramp and the very probable tumble of the fork-lift truck off the edge of the dock. Several such accidents are known to have occurred and, in at least one of them, the person operating the fork-lift truck was killed.

The dangerous possibility of an accidental gravitational drop of a loaded ramp has been a thorn in the side of manufacturers of mechanical dockboards for as long as such boards have been made. The need for eliminating the hazard was well known, but prior to this invention no way of overcoming the problem was known.

It is correct and proper, therefore, to say that the present invention is both an improvement over the aforesaid Pfleger et al. patent and a significant complement to it, since the two together provide protection against unintentional descent of the ramp whether it takes place gradually or suddenly.

It is also correct to say that the purpose and object of this invention is to provide an adjustable dockboard that is safe against any dangerous unintended or accidental descent of its ramp.

As will be fully described hereinafter, the solution to the problem of preventing a sudden gravitational drop of the ramp resided in the discovery of a practicable way of adapting the concept of inertia responsive motion stopping means to a dockboard. Broadly, of course, this way of stopping unintended motion has been employed in the elevator field, but there are vast differences between elevators which travel straight up and down, generally for substantial distances, and dockboards in which the ramp swings about a hinge axis and the range of its up and down travel during normal loading and unloading operations seldom exceeds twenty inches. Consequently, the prior use in elevators of inertia responsive motion stopping devices was of no help, and contributed nothing beyond the suggestion that inertia responsive means can be employed to stop free gravitational fall of a body if suitable structure can be devised to implement the suggestion.

The specific object of this invention, thus is to provide a mechanical dockboard with a practicable inertia responsive means to prevent free gravitational fall of its hinged ramp.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which.

Figure 3:
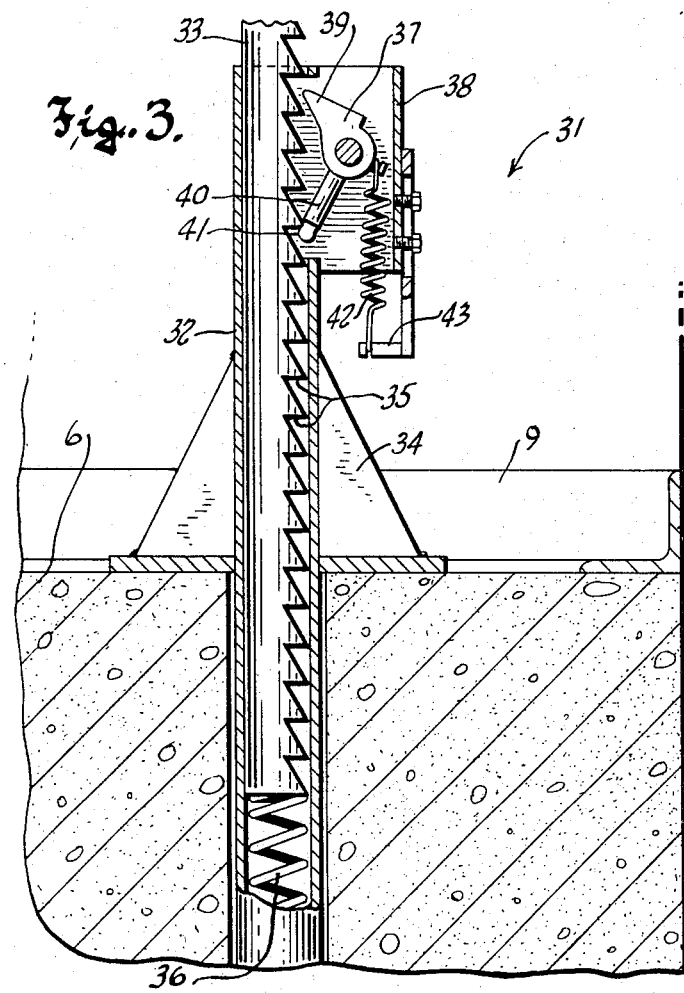
FIGURE 3 is a sectional view of a portion of the structure shown in FIGURE 2, viewing the same from the same direction but at a larger scale, to better illustrate the inertia responsive safety legs of this invention in its preferred form.
Figure 4:
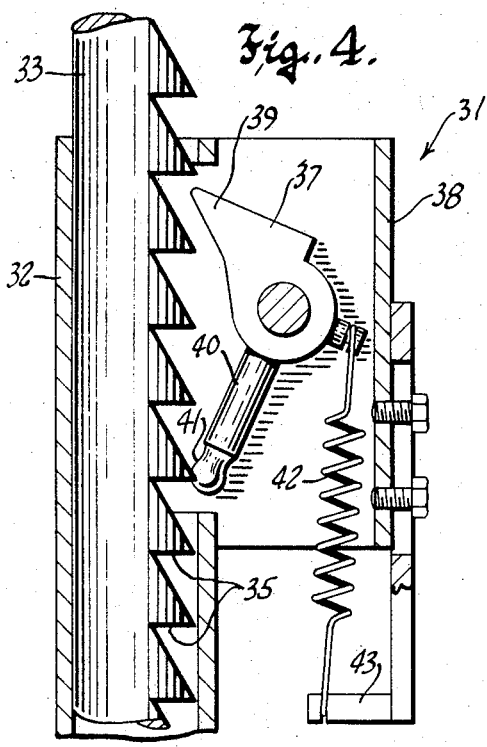
Figure 5:
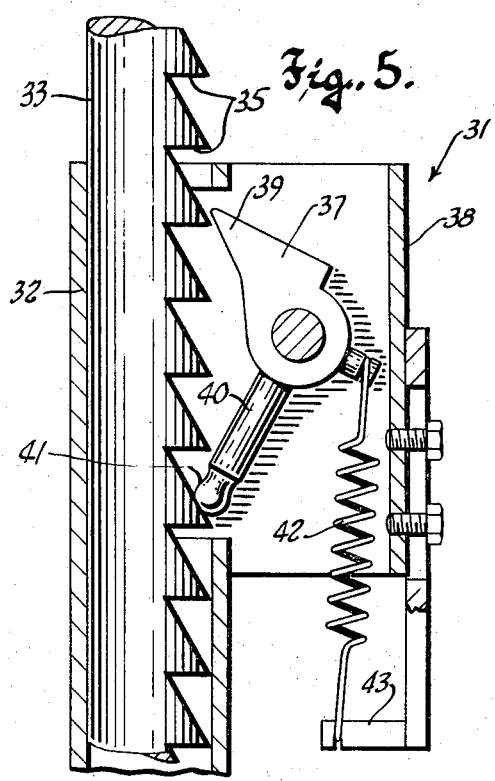
Figure 6:
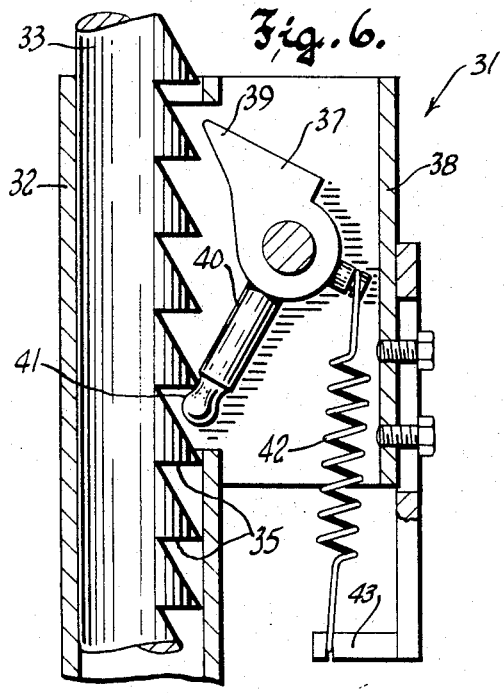
Figure 7:
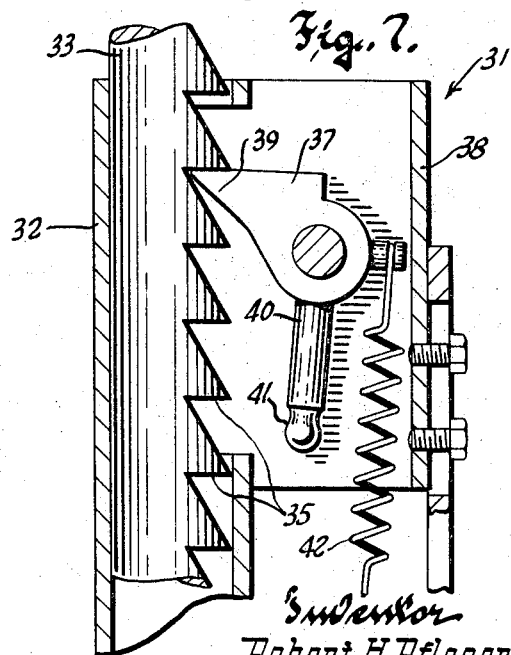

FIGURES 4, 5, 6 and 7 are sectional views similar to FIGURE 3, but showing only a portion of the structure shown therein, also at an enlarged scale, and illustrating the manner in which the safety legs of the preferred embodiment of the invention function to permit intentional lowering of the ramp for below-dock-level loading and unloading operations, but prevent a sudden free gravitational drop of the ramp;

FIGURE 8 is a sectional view through a modified embodiment of the safety leg of this invention; and FIGURE 9 is a cross sectional view through FIGURE 8 on the plane of the line 9—9.

Referring now particularly to the accompanying drawings in which like numerals indicate like parts throughout the several views, the numeral 5 designates generally the stationary frame or mounting structure of an adjustable mechanical dockboard. This frame or stationary structure may be constructed in any suitable manner and normally is fabricated from structural steel. It is adapted to be set into a pit 6 in the loading dock in which the dockboards is installed; and has front and rear members 7 and 8 connected by side rails 9 and center rails 10. The rear member 8 includes uprights 11 and an upper cross member 12 to which the ramp 13 of the dockboard is hinged, as at 14.

The ramp 13 may comprise a structural steel frame consisting of front and rear members 15 and 16 connected by a plurality of fore and aft extending rails 17, two of which form the sides of the ramp. A steel deck 18 secured to this structural frame completes the ramp.

Figure 1:
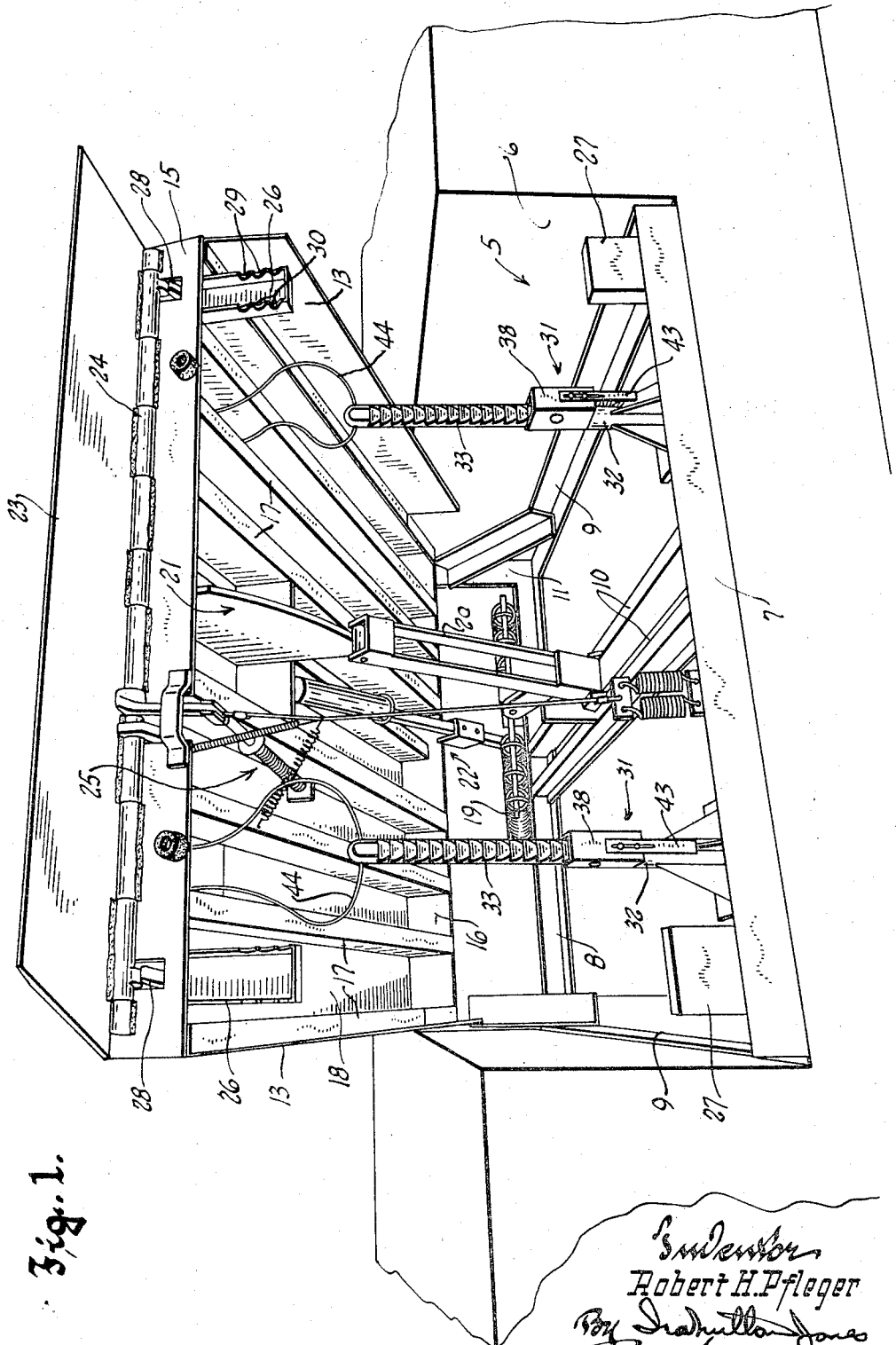
FIGURE 1 is a perspective view of a dockboard equipped with this invention in its preferred embodiment, illustrating the dockboard mounted in position on a loading dock and with its ramp elevated.

The ramp is biased upwardly by a group of tension springs 19 which apply their force to the ramp through a lifting arm 20 pivoted to the center rails 10, and having a roller at its free end which bears against the underside of a cam track 21 fixed to and depending from the bottom of the ramp. The springs 19 are sufficiently tensioned to bring the ramp to its full raised position shown in FIGURE 1, upon release of a hold-down device, indicated generally by the numeral 22, and by which the ramp is held in any position to which it may be lowered. Hence, the ramp may be held in the horizontal cross traffic position shown in full lines in FIGURE 1 or at any level within the range of its travel, indicated in light broken lines in FIGURE 2.

Figure 2:
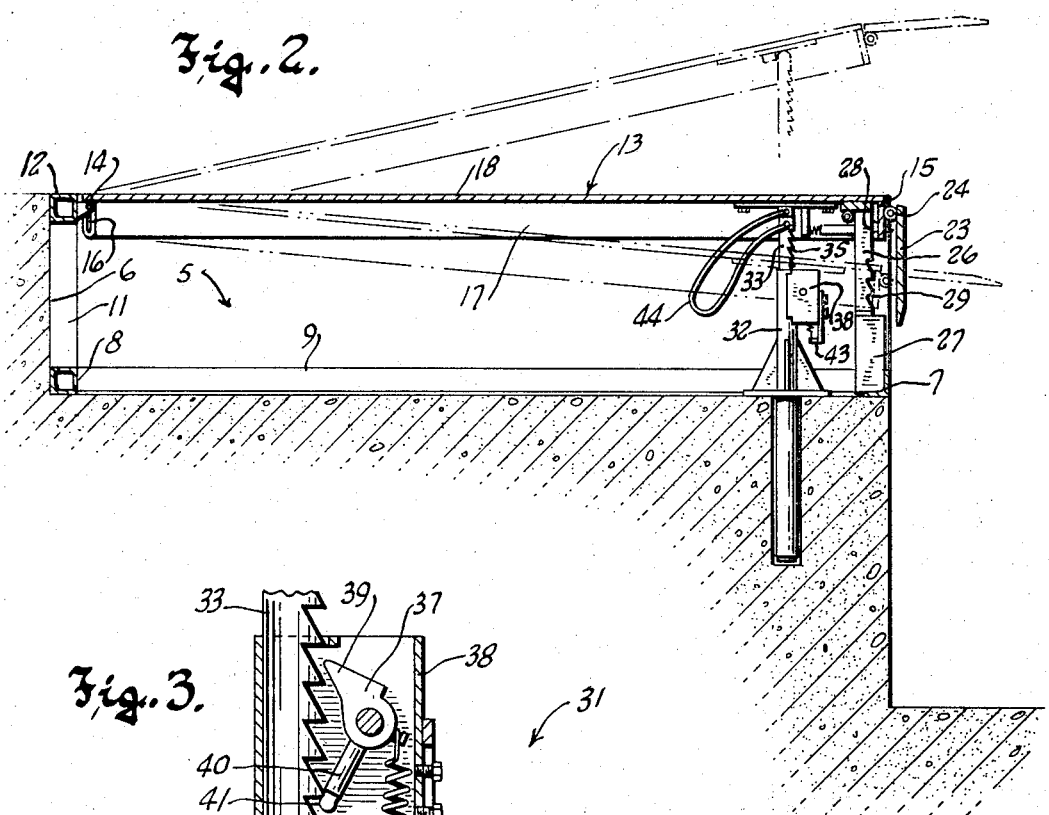
FIGURE 2 is a cross sectional view through the loading dock and the dockboard, with its ramp in horizontal cross traffic position, but in broken lines showing the ramp at the upper and lower limits of its range of adjustment for loading and unloading operations.

The front edge portion of the ramp has an extension lip 23 hinged thereto, as at 24, to swing between a pendent position in which it is shown in full lines in FIGURE 2, and an elevated or raised operative position forming substantially an extension of the ramp. The lip is automatically brought to its elevated or raised position in consequence of upward motion of the ramp. To this end, lip raising mechanism, indicated generally by the numeral 25 is provided. Since this mechanism forms no part of the present invention, it has not been illustrated in detail. Moreover, reference may be had to the McGuire Patent No. 3,203,002, issued Aug. 24, 1965, for a complete description of the lip raising mechanism. For present purposes it is sufficient to note that the mechanism 25 elevates the hinged extension lip to a point somewhat short of its fully raised position, and that this mechanism incorporates means to hold the lip in that position, but only as long as the weight of the lip is borne thereby. Accordingly, after the lip has been elevated and the ramp is "walked down," so that the lip comes to rest upon the floor of a truck, trailer or other carrier in position, the ramp will be supported at its front edge only by the floor of the truck or other carrier, and when the truck or carrier pulls away, the lip drops to its pendent position. The rise and fall of the floor of the truck or other carrier being loaded, as the load borne thereby increases or decreases, is accommodated by the provision of yieldability in the hold-down device.

If the ramp is at an elevation above dock level at the time the truck pulls away, the return of the hinged extension lip to its pendent position is accompanied by movement of a pair of cross traffic legs 26 to an operative position in line with upright supporting posts 27 which are fixed to the stationary structure 5 and project upwardly from the bottom thereof. Thus, upon further descent of the ramp, the cross traffic legs 26 come to rest upon the posts 27 and support the ramp in its horizontal cross traffic position. The cross traffic legs, as in the aforesaid Pfleger et al. patent, are hinged to the front edge portion of the ramp and are biased forwardly toward their operative positions in line with the posts 27.

Since it is necessary for the ramp to be capable of assuming a downwardly inclined below-dock-level position, the hinged cross traffic legs are automatically swung out of their operative positions whenever the hinged extension lip is elevated. To this end, a motion transmitting connection 28 is provided between each cross traffic leg and the extension lip, the details of which form no part of this invention and, moreover, may be seen in the Pfleger et al. patent.

Also, as in the Pfleger et al. patent, the cross traffic legs have notches 29 in their forward edges to provide a series of downwardly facing abutments 30 which are engageable with the top of the posts 27 to limit unintentional descent of the ramp to a small safe increment in the event the ramp is left in a downwardly inclined below-dock-level position when the truck or trailer pulls away.

The present invention thus incorporates all of the structure and features of the aforesaid Pfleger et al. patent and, in addition, eliminates the hazard of a free gravitational drop of the ramp, such as would occur if a truck on which the front end of the ramp was supported suddenly pulled away while a fork lift truck, or other load moving machine was on the ramp. This is not accomplished with the improved cross traffic legs of the Pfleger et al. patent, for in the case of a free fall, the hinged lip would travel at the same rate as the ramp and hence would not return to its pendent position in time to permit the notched cross traffic legs to assume their operative positions.

The present invention eliminates this very serious hazzard by the provision of inertia responsive safety leg means, indicated generally by the numeral 31. There are two of these safety leg means, one adjacent to each of the notched cross traffic legs, and each comprises a pair of cooperating elements 32 and 33, guidingly connected for relative movement along an upright axis. In that embodiment of the invention illustrated in FIGURES 1 through 7, inclusive, the element 32 is a tube fixed to and projecting through a pedestal 34 which is secured to the floor of the pit 6 with the tube projecting downwardly and upwardly therefrom; and the other element 33 is a stiff rod or strut slideably received in the tube and provided with a row of ratchet teeth 35 in one side thereof.

A compression spring 36 in the tube 32 bears against the bottom end of the toothed rod or strut to yieldingly urge the same upwardly out of the top of the tube. When unrestrained, this spring supports the rod or strut in a position at which its upper end engages the underside of the ramp when the ramp is at the upper limit of its range of travel during loading and unloading—as shown in dotted lines in FIGURE 2. Thus, any movement of the ramp below that upper limit—either downward or upward—is accompanied by a corresponding movement of the toothed rod or strut. It is understood, of course, that the spring 36 is by no means strong enough to support the weight of the ramp, even when unloaded. Hence, unless the toothed rod or strut is restrained against downward movement, it simply rises and falls with the changes in the elevation of the ramp that take place during normal loading and unloading operations.

However, by virtue of this invention, any sudden descent of the toothed rod or strut such as would accompany a free gravitational fall or drop of the ramp, immediately activates a motion-preventing means which in that form of the invention illustrated in FIGURES 1 through 7, is a pawl 37 pivotally mounted on the tube 32 for engagement with one of the teeth 35. Such engagement, of course, secures the toothed rod or strut 33 against downward movement with respect to the tube 32 and thereby prevents any further descent of the ramp. Only a very short sudden drop of the ramp is enough to effect load supporting engagement of the pawl with an adjacent tooth on the rod or strut.

The pawl 37 is mounted in a box-like enclosure 38 on the upper end of the tube 32 to rock about a horizontal axis with its tooth engaging portion 39 in position to engage any adjacent tooth 35. A finger 40 secured to and projecting radially from the hub of the pawl has a rounded end which provides an abutment 41 that is transiently engageable with the successive ratchet teeth 35 as the rod or strut moves up and down. The positional relationship between this abutment and the tooth engaging portion 39 of the pawl is such that passage of the abutment across the top of a tooth is accompanied by movement of the tooth engaging portion 39 into the space between two adjacent teeth, while entry of the abutment into the space between two adjacent teeth permits the tooth engaging portion to be withdrawn from between the adjacent teeth.

The mass distribution of the pawl and the finger 40 fixed thereto, with respect to the axis about which the pawl rocks, is such that gravity tends to hold the pawl engaging portion 39 against the adjacent tooth and in the path of the tooth above it. This gravity produced torque on the pawl is yieldingly opposed by a spring 42 which has one end attached to the pawl and its other end anchored to an adjustable stop 43.

During slow relative movement between the strut and the tube, as when the ramp rises and falls with the changing height of the carrier floor, the force applied to the pivoted pawl by the spring 42—which may be adjusted by raising or lowering the stop 43—is sufficient to overcome the inertia of the pawl and withdraw its tooth-engaging portion from the path of the approaching tooth before contact is made therebetween. However, upon sudden or rapid descent of the toothed rod or strut the transient engagement between the abutment 41 and the tooth which strikes it during the first short downward travel of the rod or strut, propels the tooth-engaging portion of the pawl so rapidly and so far into the space between the adjacent teeth that before the spring 42 can withdraw the pawl from the path of the tooth above it, contact takes place therebetween and further descent of the toothed rod or strut and hence of the ramp is prevented.

It will be evident, therefore, that the inertia responsive pawl and ratchet device which locks the toothed rod or strut against descent when activated by the first short drop of the ramp, in conjunction with the improved cross traffic legs of the Pfleger et al. patent, provides complete protection against accidents caused by externally produced unintentional descent of the ramp. Being inertia responsive, the pawl and ratchet device prevents a free fall or drop of the ramp from any height above or below dock level, while the improved cross traffic legs prevent potentially dangerous gradually produced descent of the ramp; and neither interferes with the up and down movement of the ramp which takes place during loading and unloading operations.

Although the spring 36 ordinarily can be depended upon to keep the toothed rod or strut in engagement with the underside of the ramp throughout the range of its up and down travel during loading and unloading operations, to guard against failure caused by the toothed rod or strut becoming stuck in the tube, the upper end of the rod or strut is connected to the ramp by a cable 44. This cable is long enough to permit the ramp to rise to its maximum elevation without imparting a pull on the toothed rod or strut as long as it rises freely, but short enough to exert a pull on the rod or strut if it becomes stuck in the tube.

The embodiment of the invention illustrated in FIGURE 8, although structurally quite different and simpler than that shown in FIGURES 1–7, inclusive, nevertheless reliably accomplishes the purposes of this invention. In this case, as in the preferred embodiment of the invention, each safety leg comprises a tube 45 and a rod 46 slideably received therein. Both of these elements are pivotally connected to their respective structures of the dockboard, the tube being pivoted as at 47 to the stationary structure and the rod being pivoted to the ramp structure, as at 48. These pivotal connections accommodate the arcuate movement of the front edge of the ramp as it rises and falls and enable the rod and tube to remain in telescoping relationship at all times. Obviously, as long as the rod is free to slide up and down in the tube there is no interference with the up and down movement of the ramp. This is the situation as long as the relative movement of the elements 45 and 46 is slow, but upon sudden rapid relative movement such as that which would accompany a free gravitational drop of the ramp, inertia responsive means, indicated generally by the numeral 50, promptly functions to lock the elements against relative movement.

The inertia responsive means 50 comprises a wedge block 51 suspended from the rod 46 by a tensile spring 52 and opposing inclined surfaces 53 and 54 on the rod 46 and the block 51, respectively. The strength of the spring is such that the block is normally supported in a position at which its inclined surface 54 is spaced a short distance from the inclined surface 53 on the bottom of the rod 46. As long as the block and the rod move in unison, these inclined surfaces remain spaced from one another, but the instant the clearance between the mating inclined surfaces is taken up and these surfaces come into contact, any tendency for the rod to move downward causes the block and the rod to become wedged in the tube 45. This is what happens when the ramp suddenly starts to drop, for although the same gravitational force acts both upon the rod and the wedge block, any sudden downward motion disturbs the rather sensitive balance between the force of the spring and the weight of the wedge block with the result that the spring snaps the block up into wedging engagement with the bottom of the rod.

Tests conducted with this modified embodiment of the invention repeatedly demonstrated its ability to reliably stop a sudden free gravitational fall or drop of the ramp, but they also resulted in having the rod wedged too tightly in the tube. To overcome that objection, the tube may be split longitudinally into complementary laterally separable sections 56 held together in any suitable way, as by bolts 57 passed through flanges 58 on the adjacent edges of the tube sections.

Inasmuch as proper functioning of the modified embodiment of the invention shown in FIGURE 8 requires that the component parts thereof be kept clean, the entire structure is preferably enclosed in a corrugated rubber boot 60.

From the foregoing description, it will be apparent to those skilled in the art that this invention constitutes a significant and very important improvement in adjustable mechanical dockboards, and that it solves a problem which confronted the industry for as long as dockboards of this type were made.

What is claimed as my invention is:

1. An adjustable dockboard for spanning the gap between a loading dock and the floor of a carrier in loading or unloading position in front of the dock, having
   a ramp with front and rear edges and means at its front edge to rest upon the floor of a carrier, and means hingedly connecting the rear edge portion of the ramp with the dock so that the ramp may rise and fall as the height of the carrier changes, characterized by safety means to support the ramp in the event the carrier pulls away from the dock and leaves the ramp unsupported at its front edge, said safety means comprising:
   (A) cooperating relatively stationary and movable elements guidingly connected with one another for relative movement;
   (B) means connecting the relatively stationary element in force transmitting relation with the dock;
   (C) means acting on said movable element and controlled by elevation and descent of the ramp when the front edge of the ramp is resting on the floor of a carrier to effect movement of the movable element in one direction with respect to the relatively stationary element during elevation of the ramp and in the opposite direction during descent of the ramp;
   (D) motion preventing means arranged when operative to react between said elements to prevent movement in said opposite direction of the movable element with respect to the relatively stationary element to thereby prevent descent of the ramp; and
   (E) control means operatively connected with said motion preventing means and the movable element to control the motion preventing means, said control means including biasing means acting upon the motion preventing means and being effective to maintain the motion preventing means inoperative as long as the movement of the movable element in response to descent of the ramp is gradual but ineffective to do so during rapid movement of the movable element caused by sudden descent of the ramp.

2. The adjustable dockboard of claim 1, wherein the motion preventing means comprises
   a pawl movably mounted on one of the cooperating elements, and a plurality of ratchet teeth on the other of said elements,
   engagement of the pawl with any one of the teeth preventing descent of the ramp below the level at which such engagement takes place.

3. The adjustable dockboard of claim 2, wherein the pawl is pivotally mounted to swing into and out of the spaces between the ratchet teeth, and wherein the means to control said motion preventing means comprises in addition to said biasing means an abutment fixed with respect to the pawl in position to be transiently engageable with the successive ratchet teeth during relative movement between said cooperating elements,
   said abutment being so disposed with respect to the tooth engaging portion of the pawl that said transient engagement of the abutment with a tooth propels the tooth engaging portion of the pawl into the space between two adjacent ratchet teeth, and wherein said biasing means biases the pawl towards a position in which its tooth engaging portion clears the ratchet teeth,
   said biasing means acting on the pawl with a force sufficient to withdraw the pawl from the path of the next tooth before contact can be made therebetween during relative motion between said cooperating elements incident to up and down movement of the ramp during normal loading or unloading operations, but insufficient to effect such withdrawal during rapid relative motion between said elements resulting from a sudden drop of the ramp.

4. In an adjustable dockboard, the safety means of claim 2,
   wherein one of said cooperating elements is a rigid strut and the other is a tubular member and has the strut lengthwise slideably received therein,
   the ratchet teeth being on the strut and the pawl being mounted on the tubular element, and the elements being disposed in an upright position the front end portion of the ramp.

5. In an adjustable dockboard, the safety means of claim 3,
   wherein said cooperating elements are located under the front end portion of the ramp in an upright leg-forming position, and
   wherein the element on which the ratchet teeth are located is a rigid strut, and the other element which has the pawl mounted thereon is a tube,
   the strut being slideably received in the tube.

6. In an adjustable dockboard, the safety means of claim 5,
   wherein it is the tube which is the relatively stationary element, and the strut projects from the upper end of the tube to engage the underside of the ramp;
   and wherein the means to effect movement of the movable element comprises the portion of the ramp which engages the strut and spring means yieldingly urging the strut upwardly and toward engagement with the ramp.

7. In an adjustable dockboard, the safety means of claim 5,
   wherein it is the tube which is the relatively stationary element, and the strut projects from the upper end of the tube to engage the underside of the ramp,
   wherein said biasing means is a spring reacting between the pawl and the stationary element,
   wherein the ratchet teeth face downward, and wherein the weight of the abutment on the pawl and the distribution of the mass of the pawl coact to impart torque upon the pawl tending to engage it with the toothed strut in opposition to torque exerted upon the pawl by the biasing means.

8. The adjustable dockboard of claim 1, wherein the relatively stationary element is a tube;
   wherein the movable element is a strut depending from the underside of the ramp and slideably received in the tube, and wherein said motion preventing means comprises a wedge block in the tube beneath the strut having an upwardly facing inclined surface opposing and engageable with a correspondingly inclined surface on the strut, and wherein said biasing means is a tension spring suspending the wedge block from the strut and normally supporting the wedge block with its inclined surface a short distance from that of the strut so that during slow downward travel of the strut said inclined surfaces do not come in contact, while upon rapid sudden descent of the strut the inertia of the wedge block and the tension in the spring coact to cause the inclined surfaces to come into contact and effect a spreading action which forces the strut and the wedge block into gripping engagement with the wall of the tube.

9. In an adjustable dockboard for spanning the gap between a loading dock and the bed of a carrier in loading or unloading position in front of the dock, regardless of the relative heights of the dock and the floor of the carrier, and which has a ramp having front and rear edges, means hingedly connecting the ramp at its rear edge with the dock so that the ramp may be raised or lowered from a cross-traffic position flush with the floor of the dock, and an extension lip hinged to the front edge of the ramp to swing between a pendent position and an elevated position adapted to rest upon the floor of a carrier in position in front of the dockboard, the improvement which comprises the combination of:

(A) leg means hinged to the underside of the ramp for movement to and from an operative position, said leg means having a plurality of vertically spaced stops, each separately engageable with a support fixed with respect to the dock, so that said leg means may support the ramp either in its cross traffic position or at any one of a number of different downwardly inclined below-dock-level positions;

(B) means governed by the movement of the extension lip and operatively connected with the leg means to render the leg means operative when the extension lip is in its pendent position and inoperative when the extension lip is in its elevated position, whereby said leg means is effective to limit to a small safe increment any externally produced descent of the ramp structure when the extension lip is in its pendent position and the ramp structure is left in a below-dock-level condition;

(C) safety means to prevent an abrupt drop of the ramp in the event support of its front edge by the floor of a carrier upon which the extension lip rests is suddenly removed while the ramp is loaded, said safety means comprising (1) relatively movable guidingly connected load supporting elements between the underside of the ramp and the dock, (2) means connecting one of said elements in force transmitting relation with the dock, (3) means acting upon the other of said elements to maintain the same in engagement with the underside of the ramp as the ramp moves up and down during loading and unloading operations, so that during descent of the ramp said elements move in one direction relative to one another, (4) motion preventing means arranged when operative to react between said elements and prevent relative movement thereof in said direction, and (5) spring means operatively connected with said motion preventing means and one of said elements to control the motion preventing means, said spring means being effective to maintain said motion preventing means inoperative as long as relative movement between said elements in response to descent of the ramp is gradual but ineffective to do so during rapid relative movement of said elements caused by abrupt descent of the ramp.

References Cited

UNITED STATES PATENTS 3,137,017    6/1964    Pfleger.
3,203,002    8/1965    McGuire.

JACOB L. NACKENOFF, *Primary Examiner.*

UNITED STATES PATENT OFFICE
CERTIFICATE OF CORRECTION

Patent No. 3,368,229                February 13, 1968

Robert H. Pfleger

It is hereby certified that error appears in the above numbered patent requiring correction and that the said Letters Patent should read as corrected below.

Column 8, line 38, after "position" insert -- below --.

Signed and sealed this 29th day of April 1969.

(SEAL)
Attest:

Edward M. Fletcher, Jr.                EDWARD J. BRENNER

Attesting Officer                Commissioner of Patents